UNITED STATES PATENT OFFICE.

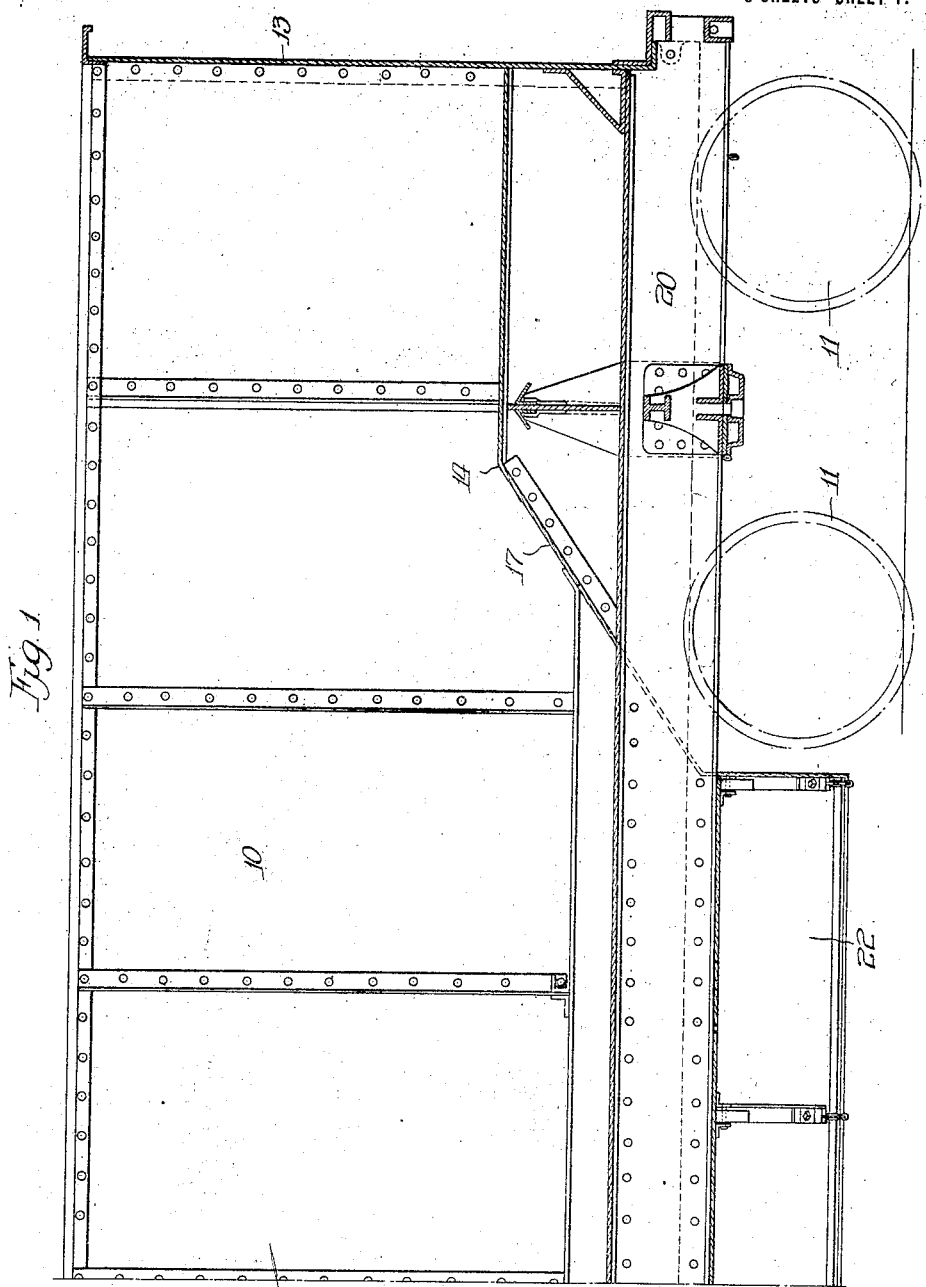

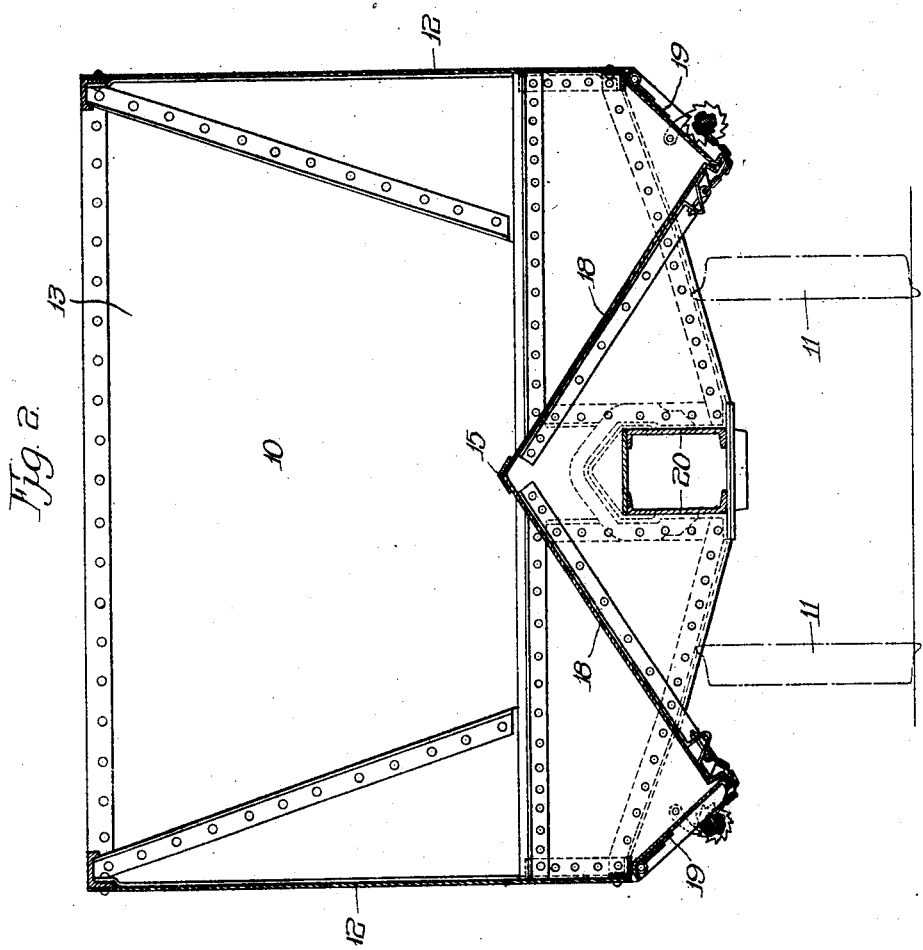

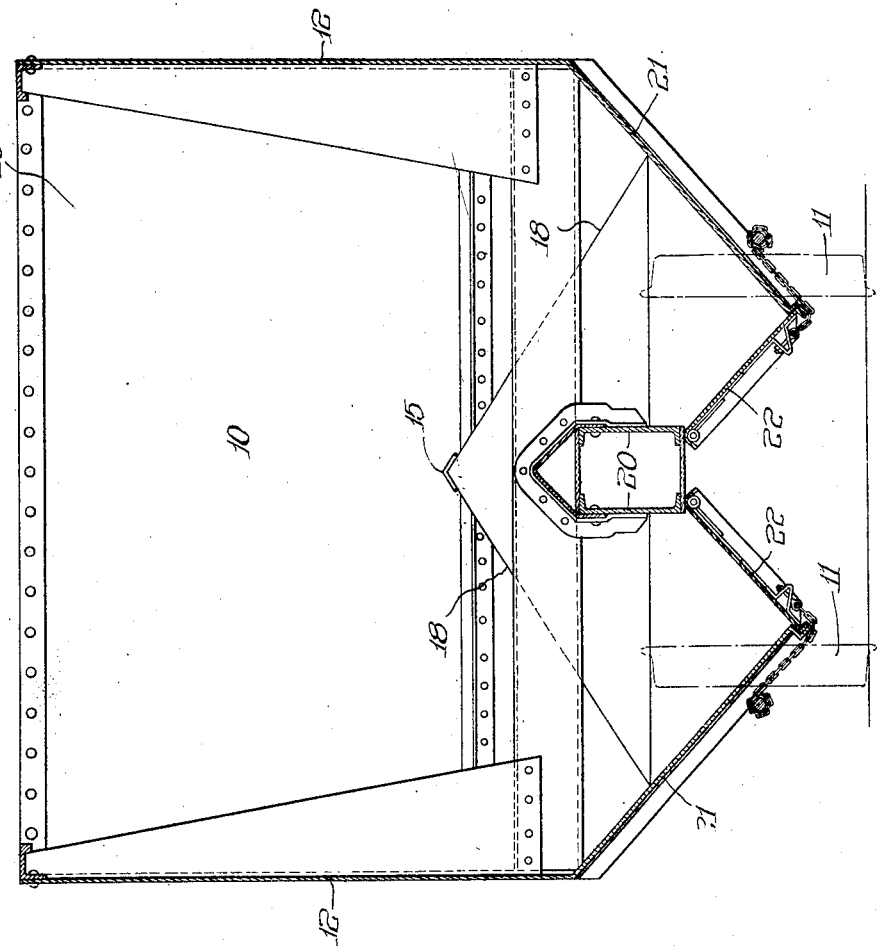

HARRY S. HART, OF CHICAGO, ILLINOIS.

DUMP-CAR.

1,289,035.  Specification of Letters Patent.  Patented Dec. 24, 1918.

Application filed September 3, 1918. Serial No. 252,317.

*To all whom it may concern:*

Be it known that I, HARRY S. HART, a citizen of the United States, residing at Chicago, in the county of Cook and State of Illinois, have invented certain new and useful Improvements in Dump-Cars, of which the following is a specification.

This invention relates to freight cars of the type commonly known as hopper cars, which are used very largely for the transportation of coal or the like dumpable material, and has among its objects the improvement of this type of car in a manner to greatly increase the load carrying capacity of the car without changing its overall dimensions, and to provide such a car from which the load may be more quickly discharged with a minimum amount of labor, the car being practically self clearing.

With these and other objects, which hereinafter will be pointed out, the invention consists of the combinations and details described in the following specification and claims.

The invention is illustrated on the accompanying sheets of drawings, in which—

Figure 1 is a longitudinal sectional view of a dump car constructed in accordance with my invention;

Fig. 2 is a transverse sectional view of the same dump car taken over the trucks; and Fig. 3 is another transverse sectional view of the same dump car taken intermediate the trucks.

It has been customary to build hopper cars for the transportation of coal, and like commodities, having inclined end portions for the trucks discharging the load through the center of the car by means of cross hoppers or longitudinal hoppers provided with suitable doors. These prior constructions are well known and require no particular description for an understanding thereof. Owing to the location of the inclined end portions over the trucks, those portions of the cars at the ends are largely useless for load carrying, so that any attempt to increase the capacity of these cars necessarily has been by lengthening the car or by increasing its height, while the discharge of the load through the car hoppers is difficult, even where special unloading stations are provided owing to the necessarily restricted door opening provided in the cross hoppers. While longitudinal hoppers also have been provided in cars of this type for discharging the load at the sides in a manner to make the unloading easier, attempts to apply this principle to the car have resulted in a greatly decreased load carrying capacity.

By my present invention I overcome the difficulties heretofore experienced in this type of car, making it possible to carry in a car of the same length a greatly increased load, and at the same time making it possible to discharge the load at a greatly reduced expenditure of time and labor.

The body 10 of this dump car, which is carried upon trucks including wheels 11 at each end of the car, comprises sides 12, ends 13, and a floor 14.

The floor over the trucks consists of downwardly and outwardly sloping stationary portions 18 extending from a point adjacent and over the center sill 20 toward the sides of the car. The floor intermediate the trucks, includes stationary portions 21 which extend downwardly and inwardly from the lower edges of the car sides 12 toward the center of the car, said stationary portions 21 extending to a point and generally being located lower than the stationary floor portions 18 over the trucks. Coöperating with the stationary floor portions 21 are dump doors 22 which preferably are pivotally connected to the center sill construction and extend downwardly and outwardly therefrom to a point where they meet the lower edges of the stationary floor portions 21, there being in effect therefore substantially two longitudinal hopper portions intermediate the trucks, one on each side of the center sill. In order that the car may be self clearing in unloading I have shown in the present embodiment of my invention the stationary floor sections 18 over the trucks extending upwardly to a point over the center sill to form an A-shaped apex 15 as a continuation of the floor sections. The upper and lower floor sections at the ends and the floor sections intermediate the same of the car respectively, may be connected by floor members 17 sloping downwardly toward the center of the car. Suitable means may be provided for closing the space between the outer edges of the sloping floor portions 18 over the truck and the sides of the car, through which space the load over the trucks is dumped. In the present embodiment of my invention I have shown side dump doors 19, which are pivotally connected at the lower edges of the sides 12, and extend downwardly and inwardly with respect to the center of the car to meet the outer edges of the A-shaped floor portions 18. Any suitable operating mechanism may be provided for operating the dump doors 19. Likewise any suitable operating mechanism may be employed for operating the dump doors 22.

By thus providing a car having stationary floor portions throughout the whole length of the car, that is stationary floor portions over the trucks and with downwardly and inwardly extending floor portions intermediate the trucks, and dump doors pivotally connected to the center sill construction and meeting the lower edges of the stationary floor sections 21 intermediate the trucks, I am enabled to provide a hopper car, the carrying capacity of which is greatly increased for any given length, width and height, at the same time making the car self cleaning, owing to the arrangement of the inclined surfaces in the car in reference to the dumping doors.

As stated before, the dumping means at the ends of the car over the trucks is at a higher level than the dumping means intermediate the trucks, and the load over the trucks is dumped outwardly and the load intermediate the trucks is dumped inwardly. While the floor over the trucks is composed of fixed A-portions, a portion of the floor between the trucks including the dump doors 22 forms a movable A-portion at a lower level from those of the A-portions over the trucks.

It is my intention to cover all modifications of the invention falling within the spirit and scope of the following claims.

What I claim is:

1. A car of the class described having sides, ends and a floor, the floor portion over the trucks being A-shaped and adapted to discharge the load outwardly toward the sides of the car, the floor between the trucks including doors, said doors extending downwardly and outwardly toward the sides of the car.

2. A car of the class described having sides, ends and a floor, the floor portion over the trucks being A-shaped and adapted to discharge the load outwardly toward the sides of the car, the floor between the trucks being at a lower level than the portion over the trucks and including doors extending downwardly and outwardly toward the sides of the car.

3. A car of the class described having sides and end portions, a floor extending from end to end of the car and composed of fixed portions, the floor portions over the trucks sloping downwardly and outwardly from the center toward the sides of the car, the fixed floor portion intermediate the trucks extending downwardly and inwardly from the sides of the car and extending to a lower level than the floor portions over the trucks, doors extending from the sides of the car to the floor portion over the trucks, and doors extending from the center of the car toward the fixed floor portion between the trucks.

4. A car of the class described having sides, ends, and a floor extending from end to end of the car, the floor over the trucks being composed of fixed A-portions and between the trucks of an A-portion having movable inner sides at a different level from those of the A-portions over the trucks.

5. A car of the class described having sides, ends, and a floor extending from end to end of the car, the floor over the trucks being composed of fixed A-portions and between the trucks of an A-portion having movable inner sides at a lower level than those of the A-portions over the trucks.

6. A car of the class described having sides, ends, and a floor including fixed A-portions over the trucks and fixed portions intermediate the trucks extending downwardly and inwardly from the sides of the car, and doors associated with each of said fixed floor portions, the doors between the trucks extending downwardly and outwardly from the center of the car.

7. A car of the class described having sides, ends, and a floor including fixed A-portions over the trucks and fixed portions intermediate the trucks extending downwardly and inwardly from the sides of the car, and doors associated with each of the said fixed floor portions.

8. A car of the class described having sides, ends, and a floor including fixed A-portions over the trucks, an independent floor intermediate the trucks including a plurality of hoppers dumping inwardly.

9. A car of the class described having sides and ends, the floor over the trucks comprising portions sloping downwardly and outwardly toward the sides of the car, outwardly swinging doors pivoted to the sides of the car coöperating with said stationary floor portions, the floor between the trucks comprising downwardly and inwardly extending stationary portions, and inwardly swinging doors pivoted adjacent the center sill coöperating with said downwardly and inwardly extending floor portions.

10. A car of the class described having sides and ends, the stationary floor portion over the trucks arranged to discharge the load downwardly and outwardly, the stationary floor portions between the trucks adapted to discharge the load downwardly and inwardly, downwardly swinging doors coöperating with said first named floor portions, and inwardly swinging doors coöperating with the last named floor portions.

Signed at Chicago, Illinois, this 29th day of August, 1918.

HARRY S. HART.